(No Model.) 3 Sheets—Sheet 2.
W. A. PATTERSON.
COTTON CLEANING AND BAT FORMING APPARATUS.
No. 563,719. Patented July 7, 1896.
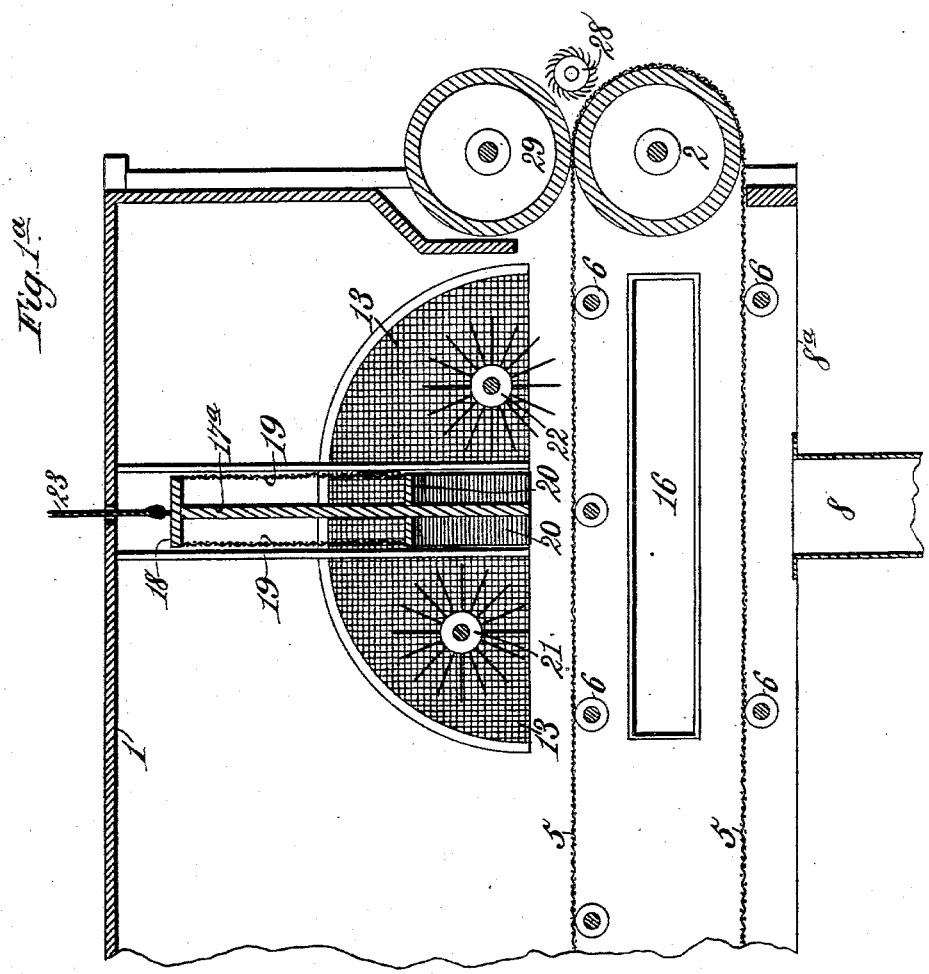
Witnesses.
Robert Everitt
Albert H. Norris
Inventor.
Warren A. Patterson.
By James L. Norris
Atty.

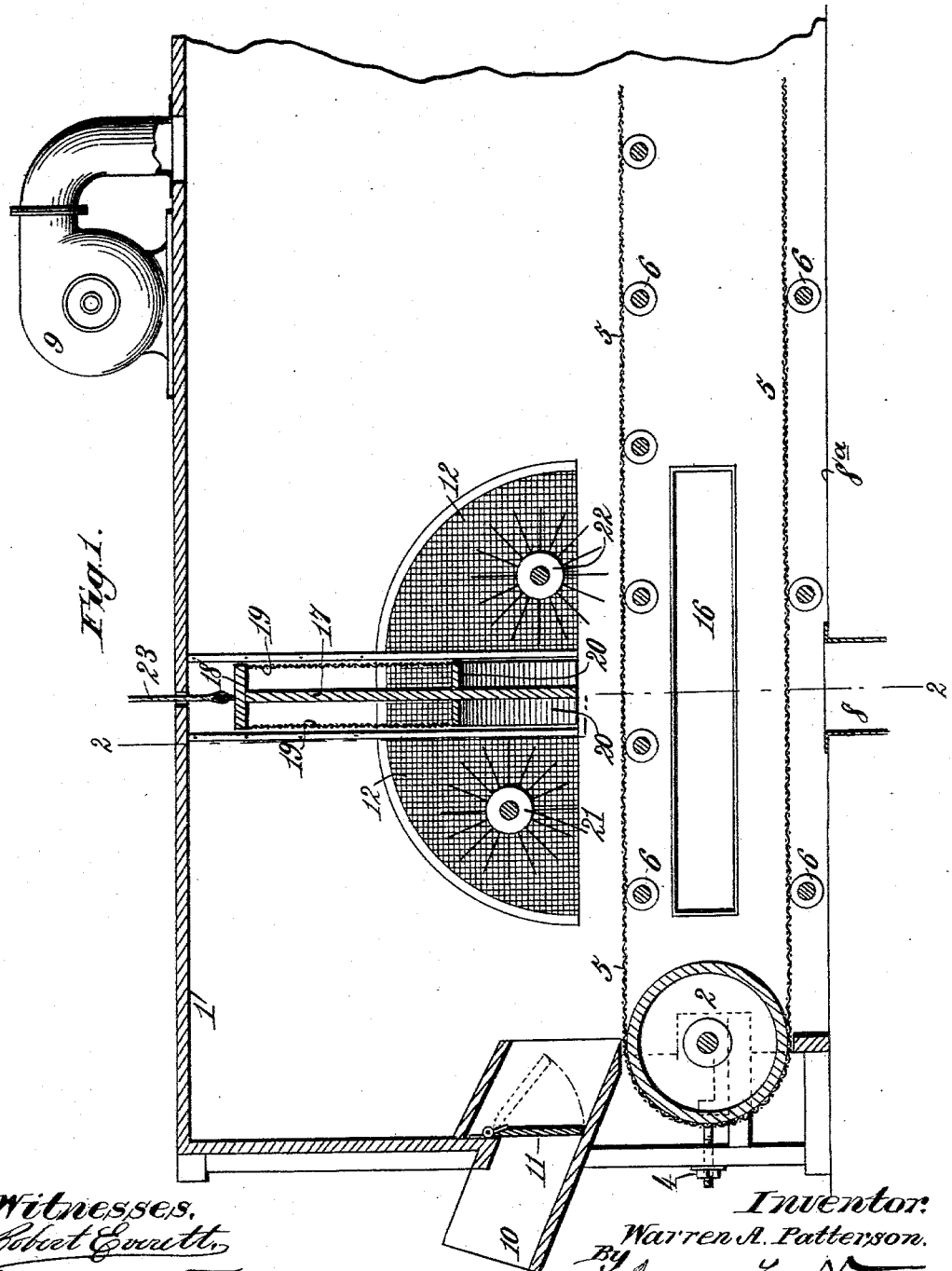

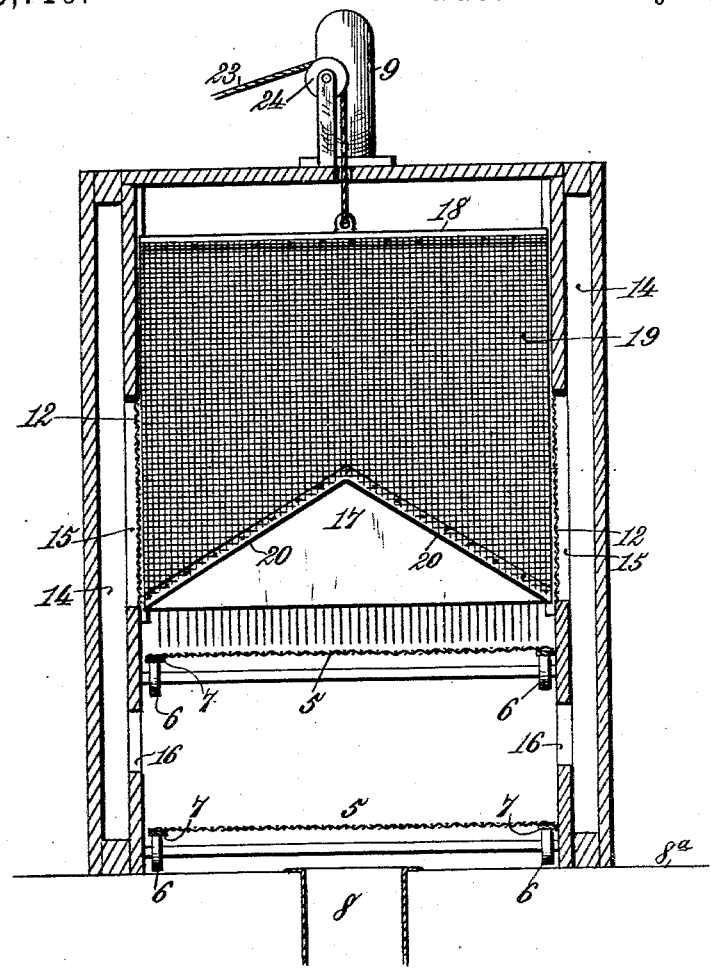

UNITED STATES PATENT OFFICE.

WARREN A. PATTERSON, OF WACO, TEXAS.

COTTON-CLEANING AND BAT-FORMING APPARATUS.

SPECIFICATION forming part of Letters Patent No. 563,719, dated July 7, 1896.

Application filed November 21, 1895. Serial No. 569,675. (No model.)

*To all whom it may concern:*

Be it known that I, WARREN A. PATTERSON, a citizen of the United States, residing at Waco, in the county of McLennan and State of Texas, have invented new and useful Improvements in Cotton-Cleaning and Bat-Forming Apparatus, of which the following is a specification.

This invention relates to means for cleaning lint-cotton, forming the same into a bat of approximately uniform thickness to prepare it in the best condition for compression into cylindrical or other shaped bales.

The chief object of the present invention is to improve the condition of the cotton, increase the market value thereof, and diminish the time and trouble and reduce the expense of cleaning and preparing lint-cotton for compression into cylindrical bales, whereby it is possible to compress the cotton to about forty pounds to the cubic foot instead of twenty-five, as heretofore.

The invention also has for its object to provide new and improved means for thoroughly cleaning lint-cotton made into bales by ordinary presses and forming the cleaned cotton into a bat.

The invention also has for its object to provide a novel, simple, efficient, and economical apparatus for taking bales of cotton made up at the old-fashioned or ordinary gins and by one operation effectually and thoroughly disintegrate the cotton and remove therefrom all dirt and dust, and thus produce a perfectly clean bat of approximately uniform depth or thickness, which is susceptible of being wound into cylindrical bales.

The invention also has for its object to provide new and improved means for cleaning and preparing cotton which has already been formed into bales at the old-fashioned or ordinary gins, or is taken direct from the gins themselves, in such manner that the particles of cotton are thoroughly separated to avoid the presence of lumps, and to effectually remove all dirt, so that the grade of the cotton and its market value are materially increased.

The invention also has for its object to provide a cleaner-condenser with a cotton-inlet chute having means for preventing the outflow of air through the chute from the interior of the cleaner-condenser when the latter is in operation and the inlet-chute is not filled with cotton, or cotton is not being fed thereinto.

The invention also has for its object to provide novel means whereby the air-pressure supplied to the interior of the cleaner-condenser is prevented from interfering with the free passage of the cotton into the cotton-inlet chute at the receiving end of the cleaner-condenser.

The novel features of my invention will be more fully hereinafter described in detail, and pointed out in the claims, reference being made to the accompanying drawings, in which—

Figure 1 is a vertical central sectional view of the receiving end portion of the improved cleaner-condenser or cotton-cleaning and bat-forming apparatus. Fig. 1ᵃ is a similar view of the delivery end of the same; and Fig. 2 is a transverse vertical sectional view taken on the line 2 2, Fig. 1.

In order to enable those skilled in the art to make and use my invention, I will now decribe the same in detail, referring to the drawings, wherein—

The numeral 1 indicates a horizontal casing or trunk of any suitable form in cross-section, and of a length sufficient to enable its interior to be divided into a plurality of compartments, as will hereinafter appear.

The casing or trunk is provided at each end with a drum 2, mounted in suitable bearings, and one of the drums is preferably mounted in bearings which can be horizontally adjusted through the medium of screw-bolts and nuts, as at 4, or by any other devices suitable for the purpose. An endless foraminous belt 5 extends around the drums 2, and the upper and lower stretches of the belt are supported at suitable intervals between the drums through the medium of upper and lower sets of supporting-rollers 6. The conveyer-belt is of a width substantially the same as the width of the casing or trunk on its interior, and is composed of wire-cloth, or other flexible material, adapted to travel on the roller 6, and bound at its edges, as at 7. The upper and lower sets of rollers 6 serve to insure a level position of the upper and lower stretches of the endless belt.

The casing or trunk is designed to rest upon a flooring or other support, as at 8ª, and the bottom of the casing is provided with dirt-discharge conduits or pipes 8. The number of dirt-discharge conduits or pipes may be increased or diminished, according to conditions required.

A powerful air-blast fan 9, or other suitable air-forcing mechanism, communicates with the top portion of the casing to deliver a strong current of air thereinto.

The casing or trunk is provided at one end with an inclined cotton-inlet chute 10, having its inner and lower end arranged to deliver the cotton directly upon the conveyer-belt 5, and in this chute is placed a self-closing door 11, pivoted at its upper end and adapted to swing inward to permit the passage of cotton through the chute into the casing of the cleaner-condenser. The door 11 is adapted to close by gravity when the inlet-chute is not filled with cotton, or when cotton is not being fed through the chute, for the purpose of preventing the outflow of air through the chute from the cleaner-condenser when the latter is in operation.

The casing or trunk is provided at each side with a plurality of wire screens, as at 12 and 13, and it is also constructed at its sides with vertical air-chambers or hollow walls, as at 14, which chambers or hollow-wall portions are located, respectively, opposite the wire screens 12 and 13, which are placed in opposite sides of the casing. The air-chambers or hollow portions are each composed of two vertical walls separated a suitable distance apart, and the wire screens are set in openings 15 in the inner walls, as will be readily understood by reference to Fig. 2. The inner walls of the air-chambers or hollow portions are provided with longitudinal air passages or slots 16, located between the upper and lower stretches of the endless foraminous conveyer-belt 5, all in such manner that the blasts or currents of air driven into the cleaner-condenser by the blast-fan or air-forcing mechanism 9 will pass laterally through the several wire screens 12 and 13, thence descend through the air-chambers or hollow portions 14, and flow through the passages or slots 16 into the space between the upper and lower stretches of the conveyer-belt, from whence the air can pass through the lower stretch of the belt and discharge into the conduits or pipes 8.

The wire screens 12 and 13 are arranged in pairs, one screen of each pair being opposite the other in the casing, and in operative connection with the pairs of screens are arranged movable bulkheads or partitions 17 and 17ª, one for each pair of screens. The bulkheads can be raised and lowered for adjusting their lower horizontal edges relatively to the upper stretch of the foraminous belt in order to control the quantity of cotton passing beneath the bulkheads or partitions, whereby a greater or less quantity of cotton can be permitted to pass for delivery to the cotton-compress hereinafter described. The bulkheads or partitions level the cotton on the foraminous conveyer-belt, and the vertical adjustment of the bulkheads or partitions renders it possible to regulate the quantity of cotton supplied by the conveyer-belt to the cotton-compress, which is advantageous.

The bulkheads or partitions 17 and 17ª are each composed of a board wall depending from a cross-bar 18, to the opposite edges of which are secured vertically-arranged wire or other screens 19, having V-shaped lower edges, to which are attached reversely-inclined strips 20, so arranged that the apex of each pair of strips is at the center of a bulkhead or partition. The board walls, constituting the main bodies of the bulkheads or partitions 17 and 17ª, extend below the strips 20 and are provided with horizontal lower edges, under which the cotton is carried by the foraminous belt to be delivered to the cotton-compress. At opposite sides of each bulkhead or partition are arranged two transverse pickers 21 and 22, adapted to be rapidly rotated, one picker serving to disintegrate and thoroughly separate the cotton, while the other serves to distribute the cotton over the upper stretch of the foraminous belt.

The cross-bars 18 of the bulkheads or partitions 17 and 17ª are secured to cables or cords 23, passing over guide-pulleys, as at 24, Fig. 2. The cables or cords are adapted to be operated by the attendant, for the purpose of raising or lowering the bulkheads or partitions, as will be obvious, to adjust their lower edges with relation to the belt. The devices for raising and lowering the bulkheads or partitions may be variously modified, and therefore I do not wish to be understood as confining myself to any particular means for this purpose.

One of the belt-supporting drums 2 is designed to be rotated by any suitable mechanism, for the purpose of imparting a horizontal traveling motion to the foraminous conveyer-belt.

The casing or trunk is provided at one end with a doffer or wiper-roller 28, having strips of suitable material to wipe or brush adhering lint-cotton from the foraminous belt and cause the cotton to pass between said roller and a plain-surfaced presser-roller 29, journaled above the doffer or wiper-roller and designed to be rotated by any suitable devices.

I have designed my improved apparatus particularly for the purpose of disintegrating, cleaning, preparing, and baling cotton which has been put up into ordinary bales at the old-fashioned or ordinary gins, and the cotton from this old-fashioned bale of cotton is introduced through the cotton-inlet chute 10. As the cotton descends through this chute it causes the door 11 to open and the cotton is delivered upon the upper stretch of the conveyer-belt 5. As the cotton passes through the cleaner-condenser the rapidly-rotating pickers disintegrate and tear up the cotton in such manner as to separate the particles thereof, remove all lumps, and entirely free it from the presence of dirt or dust. The dirt removed from the cotton is driven by the air-blast through the wire screens into the air-chambers or hollow portions in the sides of the casing, and from thence the dirt is forced through the passages or slots 16 into the space between the upper and lower stretches of the belt, from whence the dirt passes through the lower stretch of the belt and is carried off by the dirt-conduits or pipes 8. The pickers rapidly rotating within the cleaner-condenser disintegrate, clean, and prepare the cotton in such manner that every particle is thoroughly separated and it is freed from lumps and dirt, thereby improving the grade of the cotton and materially increasing the market value thereof. While the pickers are rapidly operating on the cotton to disintegrate the same and pick out all lumps and dirt, a very powerful current of air is driven from the blast-fan or other forcing mechanism into the top of the cleaner-condenser, for the purpose of carrying off all the dirt and dust knocked out of the cotton by the pickers.

The vertically-movable bulkheads having the screen portions 19 divide the interior of the cleaner-condenser into a plurality of compartments, and the system of bulkheads is such that air driven into the cleaner-condenser by the blast-fan or air-forcing mechanism is prevented from rushing back directly upon the inner end of the cotton-inlet chute, so that the air forced in by the blast-fan will not interfere with the passage of the cotton through the inlet-chute to the conveyer-belt. The inlet-chute may be connected directly with the gins for taking the cotton therefrom, so that cotton direct from the gins can be cleaned, prepared, and baled, instead of cotton from bales already made up at old-fashioned or ordinary ginners.

In the drawings I have represented two vertically-adjustable bulkheads or partitions, but in practice I employ three or more, or any number sufficient to subdivide the interior of the casing or trunk into a plurality of cotton picking and cleaning chambers or compartments, whereby the best diversion of the air-current is obtained, the cotton is successively picked apart and cleaned in the several chambers or compartments, it is more uniformly leveled as it is carried forward by the foraminous belt, and the dirt and dust separated or removed from the cotton in one chamber or compartment are carried off therefrom without liability of passing into another chamber or compartment. The successive picking and cleaning action enables me to perfectly clean the lint-cotton and to obtain a high grade of cotton from a comparatively low grade.

The bat of lint-cotton of approximately uniform depth and in a perfectly clean condition can be wound or otherwise formed into bales through the medium of any suitable baling mechanism or roller-compress.

During the time that a bale of cotton is being covered, tied, and discharged the traveling motion of the foraminous belt 5 should be stopped. While the conveyer-belt remains stationary the cotton is continuously deposited thereupon and accumulates to a greater or less depth. When the belt is again started, the mass of cotton thereupon rises at various points to a considerable distance above the level of the lower edges of the bulkheads or partitions, and is thrown back and equalized by the pickers 21, which tend to level off the surface of the cotton. As the cotton passes beneath the lower edges of the bulkheads or partitions it is leveled thereby and the cotton is subjected to the action of pickers 22, which agitate and clean the cotton and distribute it uniformly over the conveyer-belt. The rapidly-rotating pickers throw the cotton upward and cause it to strike wire screens 19, and also the wire screens 12 and 13, so that the dirt or dust contained in the cotton is driven through the screens into the air-chambers or hollow portions 14 at the sides of the casing. The blast-fan or air-forcing mechanism 9 causes a constant rush of air through the screens 12, 13, and 19, and also through the lower stretch of the conveyer-belt, whereby all the dirt and dust are carried away and the cotton is placed in the cleanest and best possible condition.

The perfectly clean cotton bat is delivered by the wiper-roller 28 and is wound or otherwise formed into cylindrical or other shaped bales through the medium of any suitable baling or roller compress.

My invention provides a single machine whereby it is possible to produce a high grade of cotton from a comparatively low grade by properly disintegrating, cleaning, and purifying the cotton and delivering it in a cleaned condition in the form of a bat of approximately uniform depth or thickness to a suitable baling mechanism or roller-compress.

By my invention the cotton is freed from all dirt and dust and is placed in a clean condition, so that it is possible to secure a more dense compression of the cotton than is possible where the latter contains more or less dirt and dust.

The form or shape of the wire screens 12 and 13, inserted in opposite sides of the casing, is immaterial. The essential feature is to provide the opposite sides of the casing with wire or other screens located directly opposite the ends of the rapidly-rotating pickers and opposite the vertically-movable bulkheads, so that the large volume of air driven into the cleaner-condenser by the blast-fan or air-forcing mechanism can readily pass through the wire screens to carry off all dirt which is agitated out of the cotton by the pickers. The blast-fan or air-forcing mechanism 9 is operated when the cotton to be treated and baled has already been put up in the form of bales at the ordinary or old-fashioned gins and is fed into the cleaner-condenser through the inclined chute 10. If the cotton is taken direct from the gins and delivered into the cleaner-condenser, or rather into the casing or trunk by some means other than the chute 10, the blast-fan or air-forcing mechanism 9 can be thrown out of action, because the gins naturally supply a very large volume of air to the cleaner-condenser, and this large volume of air can escape through the screens into the air-chambers or hollow portions at the sides of the casing, and from thence to the space between the upper and lower stretches of the endless belt, and, finally, out through the dirt conduits or pipes 8.

Having thus described my invention, what I claim is—

1. The combination of a casing or trunk having an endless, foraminous belt traveling therein, a picker arranged above the belt, screens forming parts of the casing or trunk and located at the ends of the picker, a bulk-head or partition located transversely within the casing or trunk in proximity to the picker, means for causing air to pass through the casing or trunk and said screens for the purpose of carrying off dirt and dust from the cotton, and an inclined cotton-inlet chute arranged at the receiving end of the casing or trunk, projecting thereinto, delivering the cotton to said belt, and provided with a self-closing door which permits the passage of cotton onto the belt and prevents the outflow of air from the interior of the casing or trunk through the said inlet-chute, substantially as described.

2. The combination of a casing or trunk having an endless, foraminous belt traveling therein, a picker arranged above the belt, screens forming parts of the casing or trunk and located at the ends of the picker, a bulk-head or partition located transversely within the casing or trunk in proximity to the picker, means for causing air to pass through the casing or trunk and said screens for the purpose of carrying off dirt and dust from the cotton, and an inclined cotton-inlet chute arranged at the receiving end of the casing or trunk to deliver cotton upon the foraminous belt and provided internally with a self-closing door which permits the passage of cotton and prevents the outflow of air through the said inlet-chute, substantially as described.

3. The combination of a casing or trunk containing a traveling, foraminous belt and subdivided into a plurality of cotton picking and cleaning chambers or compartments, each containing a picker for agitating and disintegrating the cotton, screens forming parts of the casing or trunk and located at the ends of the pickers for the passage of dirt and dust from the cotton, means for causing air to pass through the casing or trunk and screens, for carrying off the dirt and dust from the cotton in the several chambers or compartments, and an inclined cotton-inlet chute arranged at the receiving end of the casing or trunk, projecting thereinto with its delivery end in juxtaposition to the belt and provided with a self-closing door which permits the passage of cotton to the belt and prevents the outflow of air through the chute from the interior of the casing or trunk, substantially as described.

4. The combination in a cotton-cleaning and bat-forming apparatus, of a casing or trunk constructed with a plurality of bulk-heads or partitions which subdivide the interior thereof into a plurality of cotton picking and cleaning chambers or compartments, a foraminous belt traveling in the casing or trunk beneath the said chambers or compartments, a series of pickers arranged respectively in the chambers or compartments, whereby the cotton carried by the belt is successively agitated, disintegrated and cleaned, screens forming parts of the casing or trunk and located at the ends of the pickers for the passage of the dirt and dust separated from the cotton, means for delivering the cotton to said belt, an air-forcing apparatus connected with the upper portion of the casing or trunk for forcing air thereinto, and a cotton-inlet chute arranged at the receiving end of the casing or trunk to deliver the cotton upon the belt and provided with a self-closing door which permits the passage of the cotton and prevents the outflow of air through the inlet-chute from the interior of the casing or trunk, substantially as described.

In testimony whereof I have hereunto set my hand in presence of two subscribing witnesses.

WARREN A. PATTERSON.

Witnesses:
FRANCIS C. STANWOOD,
W. R. REEVE.